(12) United States Patent
Elsome et al.

(10) Patent No.: US 6,562,258 B1
(45) Date of Patent: May 13, 2003

(54) CATALYTIC PROCESS FOR REMOVING OXYGEN FROM SEALED PACKAGES

(75) Inventors: Amanda Maria Elsome, Henley On Thames (GB); Allin Sidney Pratt, Wallingford (GB); Elizabeth Slade, Kingston Upon Thames (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/463,285

(22) PCT Filed: Jul. 22, 1998

(86) PCT No.: PCT/GB98/02189

§ 371 (c)(1),
(2), (4) Date: Apr. 7, 2000

(87) PCT Pub. No.: WO99/05922

PCT Pub. Date: Feb. 11, 1999

(30) Foreign Application Priority Data

Jul. 30, 1997 (GB) ............................................... 9715976
Dec. 23, 1997 (GB) ............................................... 9726990

(51) Int. Cl.$^7$ ........................... C09K 3/10; C09K 15/06
(52) U.S. Cl. ................. 252/188.28; 252/186; 428/35.7; 53/400
(58) Field of Search .......................... 53/400, 432, 433, 53/434, 411, 415; 252/186, 188.28; 428/35.7; 426/127, 415

(56) References Cited

U.S. PATENT DOCUMENTS

| 4,152,463 A | | 5/1979 | Hayward et al. | |
| 4,510,274 A | * | 4/1985 | Okazaki et al. | 523/411 |
| 4,617,239 A | * | 10/1986 | Maruyama et al. | 428/452 |
| 5,089,323 A | * | 2/1992 | Nakae et al. | 428/220 |
| 5,529,833 A | * | 6/1996 | Speer et al. | 428/215 |
| 5,597,599 A | * | 1/1997 | Smith et al. | 426/316 |
| 5,641,425 A | * | 6/1997 | McKedy et al. | 252/188.28 |
| 5,955,527 A | * | 9/1999 | Cochran et al. | 524/413 |
| 6,210,730 B1 | * | 4/2001 | Mitchell | 426/312 |

FOREIGN PATENT DOCUMENTS

| GB | 734197 | 7/1955 | | |
| GB | 890550 | 3/1962 | | |
| GB | 1043095 | 9/1966 | | |
| GB | 1065992 | 4/1967 | | |
| JP | 03 284 347 | 12/1991 | | |
| WO | WO 96/07711 | * | 3/1996 | ............ C09K/15/02 |

OTHER PUBLICATIONS

O'Keefe et al., *Anoxic Storage of Fresh Beef. I: Nitrogen and Carbon Dioxide Storage Atmospheres,* Meat Science, vol. 5, No. 1, pp. 27–39, Dublin, Ireland, 1981.

The Patent Office (GB) Search Report, search date: Oct. 22, 1997.

International Search Report, search date: Sep. 30, 1998.

* cited by examiner

Primary Examiner—Rinaldi I. Rada
Assistant Examiner—Gloria R Weeks
(74) Attorney, Agent, or Firm—Morgan, Lewis & Bockius LLP

(57) ABSTRACT

A method of removing small quantities of entrained oxygen from sealed packages containing an oxidizable product said method utilizing a particulate catalyst which has high activity for combining hydrogen and oxygen, the catalyst particles being partially encapsulated on a surface of a water-insoluble adhesive which is applied to a predetermined area of the inside surface of the sealed package. The catalyst can be a platinum group metal supported on a porous inert carrier. The adhesive material can be poly(vinylbutyral), nitrocellulose, ethyl cellulose, a polyurethane or a silicone material (e.g., a silicone rubber). The oxidizable product can be a perishable foodstuff.

16 Claims, No Drawings

CATALYTIC PROCESS FOR REMOVING OXYGEN FROM SEALED PACKAGES

This invention relates to a method of removing small quantities of entrained oxygen from closed containers, sealed bags and the like (hereinafter called "sealed packages") which contain oxidisable products, including perishable foodstuff, by utilisation of a catalytic oxygen scavenging composition.

In this patent specification the term oxidisable product includes materials which are damaged by oxygen or spoiled by micro-organisms in the presence of oxygen.

It is well known that the deterioration of foodstuff due to oxidation and/or microbial spoilage can be reduced by storing the foodstuff under anaerobic conditions. One means of achieving this is to place the foodstuff in a sealed package filled with an inert gas or gases such as nitrogen and/or carbon dioxide. It is very difficult, however, to completely exclude oxygen from the interior of the package with the result that this technique only serves to slow down the rate of deterioration of the foodstuff. If, however, the residual entrained oxygen, and also oxygen exuded by the foodstuff itself with time, in the sealed package can be removed or converted within the package after sealing a substantially longer life is achieved for the foodstuff.

In a packaging system as described above, the small quantities of entrained oxygen can be eliminated by including hydrogen in the sealed package to react with the entrained oxygen to produce water. A quantity of hydrogen equal to or greater than that stoichiometrically required to combine with the entrained oxygen is introduced into the package along with an inert gas or gases either before or after sealing. Such foodstuff preservation methods utilise catalysts which have high activity for combining hydrogen and oxygen to produce water.

There are many catalysts which can be used in such oxygen scavenging applications. Suitable catalysts include platinum group metals which conveniently can be impregnated on a finely divided inert porous support material. Such supported catalysts are commonly contained in sealed pouches or sachets of microporous film which are stuck on to the interior surface of the packaging material. Sealed pouches or sachets, however, suffer from the disadvantages that a considerable amount of the expensive catalyst is required and also the sachet is liable to rupture with the catalyst getting onto the foodstuff.

The publication Meat Science Vol. 5 (No.1), 27–39, 1981 discloses a technique for storing near which utilises a palladium catalyst oxygen system in which the catalyst is incorporated within the structure of the plastic film packaging material. JP-A-328437 describes an oxygen scavenging system comprising a combination of a composition which absorbs oxygen and generates hydrogen with a noble metal catalyst. WO-A-960771 describes an oxygen absorption system wherein the oxygen absorption composition dispersed in an emulsion is printed on to the packaging material.

We have found that a superior oxygen scavenging system can be obtained by admixing or impregnating an adhesive material with the catalyst in a particular manner and fixing the thus obtained composite on to the inside surface of the packaging material.

According to the present invention there is provided a method of removing an entrained amount of oxygen from a sealed package containing an oxidisable product comprising the steps of:

(a) dispersing in a solution of a water-insoluble adhesive material a particulate catalyst which has high activity for combining hydrogen and oxygen;

(b) applying the dispersion to a pre-determined area of the inside surface of the material from which the package is made;

(c) evaporating solvent from the dispersion in such manner that the catalyst particles become partially encapsulated on a surface of the dried adhesive; and (d) introducing a mixture of an inert gas or gases and hydrogen into the package either before or after sealing of the package, the hydrogen being present in the package in sufficient quantity to react with the entrained oxygen to form water.

In this specification the term "a surface of the dried adhesive" means a surface which is in contact with the gases in the sealed package and can be the outermost surface of the dried adhesive and/or the surface of pores in the dried adhesive.

The inert gas or gases introduced into the package is a gas or gases which take no part in the reaction between hydrogen and oxygen and suitably is nitrogen and/or carbon dioxide.

Suitably also, the dispersion is subjected to high shear-mixing before it is applied to the inside surface of the material from which the package is made.

Conveniently, the dispersion is applied to the inside surface of the material from which the package is made by printing, brushing or spraying.

Preferably, the catalyst comprises a platinum group metal or combinations thereof supported on a porous inert carrier.

The porous inert carrier suitably is carbon, alumina, silica, zirconia, titania, ceria or a carbonate.

Further preferably, the adhesive material is poly (vinylbutyral), nitrocellulose, ethyl cellulose, a polyurethane or a silicone material (eg a silicone rubber).

The dispersion of catalyst in the solution of adhesive material may contain one or more additives commonly used in ink compositions, for example one or more of plasticisers, fillers, driers, surfactants and pigments.

The method of the invention is particularly useful for the preservation of perishable foodstuff.

In a modification of the method of the present invention the dispersion of catalyst in water-insoluble adhesive is dried before being applied to the inside surface of the material from which the package is made.

Conveniently, the dried dispersion is stored before use under conditions which prevent catalytic de-activation of the dispersion.

Preferably, the dried dispersion is stored before use in air saturated with water or under a vacuum or in an inert atmosphere such as nitrogen or argon.

In one embodiment of the method of the present invention the dispersion comprises a label which is attached to the inside surface of the material from which the package is made.

From another aspect, the present invention is a sealed package containing an oxidisable product from which package oxygen has been removed by any of the methods described and claimed herein.

From yet another aspect, the present invention is an oxygen scavenging composition which comprises particles of a catalyst, which has high activity for combining hydrogen and oxygen, partially encapsulated on a surface of a water-insoluble adhesive material.

Suitably, the catalyst is a platinum group metal or combinations thereof supported on a porous inert carrier.

Conveniently, the porous inert carrier is carbon, alumina, silica, zirconia, titania, ceria or a carbonate.

Preferably, the water-insoluble adhesive material is poly (vinylbutyral), nitrocellulose, ethyl cellulose, a polyurethane or a silicone material.

Further preferably, the oxygen scavenging composition contains one or more additives commonly used in inks, for example, one or more of plasticisers, fillers, driers, surfactants and pigments.

The oxygen scavenging composition of the invention may be in the form of a label which is attachable to the inside surface of a sealed package from which oxygen is to be removed.

We have found that the catalytic activity of some oxygen scavengers of the subject invention falls away considerably over a period of time if the dried scavenger is stored in air before being used. The rate of reduction of the catalytic activity depends on the composition of the particular oxygen scavenger and varies from scavenger to scavenger. This problem can be alleviated by storing the oxygen scavenger before use under conditions which prevent catalytic de-activation. This can be achieved by storing the scavenger in air saturated with water. Other suitable conditions are storage under vacuum or in an inert atmosphere such as nitrogen or argon.

The sealed packages holding the oxygen scavenging composition and the perishable foodstuff or other oxidisable product may be in the form of plastic bags, metal cans, glass jars and the like or they may be made of plastic wrap materials, aluminium foil or combinations thereof as well as of paper or cardboard types of materials which in turn may be coated or impregnated with wax or plastic to provide generally air impervious and waterproof materials.

From a practical aspect, the oxygen scavenging composition of the present invention can be applied in a distributed manner on the interior surface of the packaging material thus providing an extended surface area of contact for the entrained oxygen and the hydrogen within the sealed package. Such an extended area of contact is more difficult to achieve with pouches or sachets containing the catalyst. From an economical aspect, it is an advantage to have a simple system whereby the mixture of catalyst and adhesive can be printed, brushed or sprayed onto the interior surface of the packaging material or attached as a label to the interior surface of the packaging material.

Although the present invention has been described mainly with reference to the preservation of perishable foodstuff, the oxygen scavengers of the invention can be used in other applications where small quantities of entrained oxygen can have a detrimental effect on oxidisable products. For example, the present invention can be applied usefully to the storage of chemicals, pharmaceuticals, clothes, skins, medical equipment, instruments, electronic components, artefacts, security packages (eg bank notes) and other oxidisable products.

We have discovered that oxygen scavenging compositions with catalyst particles partially encapsulated on a surface of certain adhesives give enhanced catalytic activity and durability compared to oxygen scavenging compositions in which the catalyst particles are completely covered by the adhesive. This enhanced performance results from the fact the catalyst particles are directly exposed to the hydrogen and oxygen to be reacted. This surface availability of catalyst can be achieved with water-insoluble adhesives but not with water-soluble adhesives. It is believed, that with water-insoluble adhesives the hydrophobic catalyst particles repel the adhesive and migrate towards the surface of the adhesive where they become partially exposed to the outside gaseous environment. On the other hand, with water-soluble adhesives, the catalyst particles are smothered by the adhesive and consequently movement towards the surface of the adhesive is prevented.

The rate at which the catalyst/adhesive dispersion is dried is very important. It is essential that the catalyst particles have enough time to reach the surface of the adhesive before gelling of the adhesive occurs thus stopping the migration of the catalyst particles to the surface of the adhesive. The drying time for the adhesive can be lengthened by conducting the drying in an atmosphere saturated with the solvent for the adhesive. Also, hot drying should be avoided because it speeds up the gelling process and the catalyst particles become entrapped in the adhesive before they reach the surface of the adhesive.

Examination of micrographs of back-scatter analysis showed that the most successful oxygen scavenging compositions were those in which the catalyst particles were evenly distributed on a surface of the adhesive.

The following examples serve to illustrate certain embodiments and aspects of the present invention.

In order to check various oxygen scavenging compositions for catalytic activity, a test procedure was developed which utilised apparatus to determine oxygen concentration versus residence time in a 3.5 liter test reactor receiving a typical gas blend of approximately 1% oxygen, approximately 3% hydrogen and the balance carbon dioxide and/or nitrogen.

Notes:
1. The activity of the scavengers tested in the following Examples is expressed as the time ($T_{50}$) taken for the oxygen content of the test gas to be reduced by 50%.
2. In each Example, the reduction in oxygen content was measured beyond $T_{50}$ but each experiment was stopped before total oxygen removal was achieved.

EXAMPLE 1

10 mg of 10% Pd on carbon (moisture content 12.2%) was dispersed in 300 µl of 5% w/w ethyl cellulose in IMS. The sample was subjected to high shear mixing and then spread into a film on Mylar polyester sheet and left to air dry. This scavenger composition had a $T_{50}$ of 36 minutes and furthermore reduced the oxygen content of the test gas to 0.3% in 60 minutes.

EXAMPLE 2

The scavenger composition of Example 1 was prepared with no high shear mixing. This time the scavenger composition again had a $T_{50}$ of 36 minutes and furthermore reduced the oxygen content of the test gas to 0.19% in 84 minutes.

EXAMPLE 3

10 mg of 10% Pd on carbon (moisture content 12.2%) was dispersed in 300 µl of 10% w/w PVB in IMS and spread into a film on Mylar and left to air dry. This scavenger composition had a $T_{50}$ of 52 minutes and furthermore, reduced the oxygen content of the test gas to 0.31% in 123 minutes.

EXAMPLE 4

A solution of 10% polyurethane in 10% methyl ethyl ketone/ethyl acetate (9:1) was prepared (5 g polyurethane made up to 50 g with the methyl ethyl ketone/ethyl acetate solvent (9:1). 3 g of 10% Pd on carbon (moisture content 57%) was dispersed in 39 ml of the aforementioned solution and the resulting suspension was subjected to high shear mixing for 10 minutes. This catalyst suspension was then sprayed onto 25 µm polyurethane film and left to air dry. This scavenger had a $T_{50}$ of approximately 90 minutes and furthermore reduced the oxygen content of the test gas to 0.08% in 360 minutes.

EXAMPLE 5

Example 4 above was repeated using a 5% polyurethane mixture instead of a 10% polyurethane mixture. The catalyst suspension was sprayed onto 150 μm polyurethane film and left to air dry. A piece of film 34.02 cm² and weighing 0.71 g when tested for catalytic activity had a $T_{50}$ of approximately 10 minutes and furthermore reduced the oxygen content of the test gas to 0.13% in 75 minutes.

A piece of film exactly half the size (17.01 cm²) when tested for catalytic activity had a $T_{50}$ of approximately 75 minutes and furthermore reduced the oxygen content of the test gas to 0.23% in 110 minutes.

EXAMPLE 6

The catalyst suspension of Example 5 above was drawn into a film on Mylar polyester sheet and dried at room temperature. This scavenger had a $T_{50}$ of approximately 180 minutes and furthermore reduced the oxygen content of the test gas to 0.4% in 240 minutes.

EXAMPLE 7

Labels consisting of the catalyst suspension of Example 5 on 150 μm polyurethane sheet (39 mm×40 mm) (Tuftane, Lord Corporation) were prepared as follows. Squares of approximately 3 cm×3 cm were masked off on the polyurethane sheet. 39 cm³ of the catalyst suspension was subjected to high shear mixing for 10 minutes. Approximately 12 cm³ of the thus-mixed catalyst suspension were sprayed onto the masked template, which consisted of 20 labels each of approximately 3 cm×3 cm using a Sata mini-jet spray, size 1.0. The sprayed samples were left to dry at room temperature. The masking tape was removed and labels were cut to 39 mm×40 mm, within which was the sprayed catalyst. These samples showed very good activity and durability and had a $T_{50}$ of approximately 135 minutes and reduced the oxygen content of the test gas to 0.18% in 495 minutes.

EXAMPLE 8

3 g of 10% Pd on carbon (moisture content 57%) was dispersed in 5% polyurethane w/w in methyl ethyl ketone : ethyl acetate (9:1). The 5% polyurethane solution was made by dissolving 5 g of Estane pellets—5702F, B F Goodrich and making up to 100 g with methyl ethyl ketone:ethyl acetate (9:1). The 5% polyurethane suspension containing the catalyst was subject to high shear mixing for 10 minutes using a Silverson mixer.

A template of 50 squares (2 cm×2 cm) was masked off on 150 μm polyurethane sheet (Tuftane, Lord Corporation). Approximately half of the catalyst mixture (=20 cm³) was placed in the reservoir of a Sata mini-jet spray gun, size 1.0. The 50 (2 cm×2 cm) squares were sprayed evenly and left to dry at room temperature. After 30 minutes the masking tape was removed. The labels were evenly covered and very durable.

One of the above-mentioned labels was cut away from the polyurethane sheet and tested for its oxygen scavenging activity. The $T_{50}$ of this label was 160 minutes and it reduced the oxygen content of the test gas to 0.38% in 285 minutes.

EXAMPLE 9

10 mg, 10% Pd on carbon (moisture content 12.2%) was suspended in 300 μl of 10% w/w nitrocellulose (ICI grade DLX 3-5) in IMS/ethyl acetate (90:10). The dispersion was spread onto a film on Mylar polyester sheet and left to dry at room temperature overnight. This sample had a $T_{50}$ of 108 minutes and reduced the oxygen content of the test gas to 0.15% in 200 minutes.

EXAMPLE 10

100 mg, 10% Pd on carbon (moisture content 12.2%) was dispersed in 8.1 g of 12.5% w/w silicone rubber (General Electric Company's RTV 108) in MIBK. This suspension was sprayed onto polypropylene paper. This scavenger had a $T_{50}$ of 45 minutes and reduced the oxygen content of the test gas to 0.28% in 91 minutes.

EXAMPLE 11

9 g of 10% Pd on carbon (moisture content 57%) was dispersed in 117 cm³ of 5% w/w of polyurethane in methyl ethyl ketone:ethyl acetate (9:1) and subjected to high shear mixing in a Silverson mixer for 10 minutes. 10 cm³ of this catalyst suspension was sprayed onto a template of three rows of 2 cm×2 cm squares on 125μ polyurethane sheet (Tuftane, Lord Corporation). The three rows were sprayed with four passes each. Two labels (a) and (b) were cut from the sheet after drying in air for 5 minutes. Label (a) was immediately tested for oxygen scavenging ability and had a $T_{50}$ of 135 minutes and furthermore reduced the oxygen content of the test gas to 2.34% in 495 minutes.

EXAMPLE 12

6 cm³ of the catalyst suspension of Example 11 was sprayed onto 4 cm×4 cm labels of 125μ polyurethane sheet using four passes to obtain the same amount of catalyst per unit area as with the 2 cm×2 cm labels of Example 11. Two labels (a) and (b) were cut from the sheet after drying in air for 10 minutes. Label (a) was immediately tested for oxygen scavenging ability and had a $T_{50}$ of 75 minutes and furthermore reduced the oxygen content of the test gas to 15.1% in 180 minutes.

EXAMPLE 13

9 g of 10% Pd on carbon (moisture content 57%) and 2.16 g of activated charcoal (Ceca 2S) were dispersed in 117 cm³ of 5% w/w of polyurethane in methyl ethyl ketone:ethyl acetate (9:1) and subjected to high shear mixing in a Silverson mixer for 10 minutes. This gave a 50% by wt filled catalyst dispersion. A template of three rows of 2 cm×2 cm squares on 125μ polyurethane sheet was sprayed with 8 cm³ of the catalyst dispersion, four passes per row. The labels were left to dry in air for 10 minutes. Two labels (a) and (b) were removed from the sheet and label (a) was immediately tested for oxygen scavenging ability and had a $T_{50}$ of 165 minutes and furthermore reduced the oxygen content of the test gas to 2.5% in 660 minutes.

EXAMPLE 14

A catalyst dispersion similar to that of Example 13 was prepared but this time with 5.1 g of activated charcoal filler (Ceca 28) to give a 60% by wt filled catalyst dispersion. The dispersion was subjected to high shear mixing in a Silverson mixer for 10 minutes. A template of three rows of seven 2 cm×2 cm was placed on a 125μ polyurethane sheet. 8 cm³ of the catalyst dispersion was sprayed onto the sheet until all three rows were covered. Two labels (a) and (b) were removed from the sheet after drying in air for 10 minutes. Label (a) was immediately tested for oxygen scavenging ability and had a $T_{50}$ of 107 minutes and furthermore reduced the oxygen content of the test gas to 15.9% in 255 minutes.

EXAMPLE 15

Label (b) of Example 11 was stored over water for 44 days. The label was then tested for oxygen scavenging ability and it reduced the oxygen content of the test gas to 70% in 495 minutes.

EXAMPLE 16

Label (b) of Example 12 was stored over water for 8 days. The label was then tested for oxygen scavenging ability and had a $T_{50}$ of 90 minutes and furthermore reduced the oxygen content of the test gas to 2.8% in 330 minutes

EXAMPLE 17

Label (b) of Example 14 was stored over water for 58 days. The label was then tested for oxygen scavenging ability and had a $T_{50}$ of 225 minutes and furthermore reduced the oxygen content of the test gas to 33.4% in 1005 minutes

COMPARATIVE EXAMPLES

A. To illustrate the importance of partial encapsulation on the surface of the adhesive material, the scavenger composition of Example 1 was further coated with a film of 5% w/w ethyl cellulose drawn under the same conditions as Example 1. The resulting composition was inactive for hydrogen/oxygen combination.

B. To illustrate deactivation of a catalyst composition by contact with air, label (b) of Example 13 was left standing in air for two days and when tested showed much reduced oxygen scavenging ability compared to label (a) of Example 13.

What is claimed is:

1. A method of removing an entrained amount of oxygen in a sealed package containing an oxidisable product comprising the steps of:
   (a) dispersing in a solution of a water-insoluble adhesive material a particulate catalyst which has high activity for combining hydrogen and oxygen;
   (b) applying the dispersion to a predetermined area of the inside surface of the material from which the package is made;
   (c) evaporating solvent from the dispersion in such manner that the catalyst particles become partially encapsulated on a surface of the dried adhesive; and
   (d) introducing a mixture of an inert gas or gases and hydrogen into the package either before or after sealing of the package, the hydrogen being present in the package in sufficient quantity to react with the entrained oxygen to form water.

2. The method as claimed in claim 1 wherein the inert gas or gases introduced into the package is nitrogen and/or carbon dioxide.

3. The method as claimed in claim 1 wherein the dispersion is subjected to high shear-mixing before it is applied to the inside surface of the material from which the package is made.

4. The method as claimed in claim 1 wherein the dispersion is applied to the inside surface of the material from which the package is made by printing, brushing or spraying.

5. The method as claimed in claim 1 wherein the catalyst comprises a platinum group metal or combinations thereof supported on a porous inert carrier.

6. The method as claimed in claim 5 wherein the porous inert carrier is carbon, alumina, silica, zirconia, titania, ceria or a carbonate.

7. The method as claimed in claim 1 wherein the adhesive material is poly(vinylbutyral), nitrocellulose, ethyl cellulose, a polyurethane or a silicone material.

8. The method as claimed in claim 1 wherein the dispersion of catalyst in the solution of adhesive material contains one or more additives commonly used in ink compositions.

9. The method as claimed in claim 8 wherein the additive is one or more of plasticisers, fillers, driers, surfactants and pigments.

10. The method as claimed in claim 1 wherein the oxidisable product is a perishable foodstuff.

11. The method as claimed in claim 1 wherein the dispersion of catalyst in water-insoluble adhesive is dried before being applied to the inside surface of the material from which the package is made.

12. The method as claimed in claim 11, wherein the dried dispersion is stored before use under conditions which prevent catalytic de-activation of the dispersion.

13. The method as claimed in claim 12, wherein the dried dispersion is stored before use in air saturated with water or under a vacuum or in an inert atmosphere such as nitrogen or argon.

14. The method as claimed in claim 11 wherein the dispersion comprises a label which is attached to the inside surface of the material from which the package is made.

15. A sealed package containing an oxidised product from which package entrained oxygen has been removed by the method of claim 1.

16. A method of removing an entrained amount of oxygen in a sealed package containing an oxidisable product comprising the steps of:
   (a) dispersing in a solution of a water-insoluble adhesive material a particulate catalyst which has high activity for combining hydrogen and oxygen;
   (b) applying the dispersion to a predetermined area of the inside surface of the material from which the package is made;
   (c) evaporating solvent from the dispersion in such manner that the catalyst particles become partially encapsulated on a surface of the dried adhesive;
   (d) introducing a mixture of an inert gas or gases and hydrogen into the package either before or after sealing of the package, the hydrogen being present in the package in sufficient quantity to react with the entrained oxygen to form water; and
   wherein said dispersion comprises particles of a catalyst which has high activity for combining hydrogen and oxygen partially encapsulated on a surface of a water-insoluble adhesive material.

* * * * *